US012810870B2

(12) United States Patent
Selvakumarasingam et al.

(10) Patent No.: US 12,810,870 B2
(45) Date of Patent: Nov. 24, 2026

(54) ARTIFICIAL INTELLIGENCE DEVICE FOR ROBUST MULTIMODAL ENCODER FOR PERSON REPRESENTATIONS AND CONTROL METHOD THEREOF

(71) Applicant: LG ELECTRONICS INC., Seoul (KR)

(72) Inventors: Anith Selvakumarasingam, Oshawa (CA); Homa Fashandi, Toronto (CA)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 18/634,519

(22) Filed: Apr. 12, 2024

(65) Prior Publication Data

US 2024/0347065 A1 Oct. 17, 2024

Related U.S. Application Data

(60) Provisional application No. 63/459,257, filed on Apr. 13, 2023.

(51) Int. Cl.
*G10L 17/10* (2013.01)
*G06V 10/776* (2022.01)
(Continued)

(52) U.S. Cl.
CPC ............ *G10L 17/10* (2013.01); *G06V 10/776* (2022.01); *G06V 10/82* (2022.01); *G06V 40/50* (2022.01);
(Continued)

(58) Field of Classification Search
CPC ......... G10L 17/10; G10L 17/04; G10L 17/18; G06V 10/776; G06V 10/82; G06V 40/50; G06V 40/70; G06V 40/172
See application file for complete search history.

(56) References Cited

U.S. PATENT DOCUMENTS 11,238,843 B2 * 2/2022 Arik ........................ G10L 13/08
12,272,371 B1 * 4/2025 Giri ........................ G06N 20/00
(Continued)

OTHER PUBLICATIONS

Qian et al., Audio-Visual Deep Neural Network for Robust Person Verification, Feb. 8, 2021, IEEE vol. 29, 1079-1092.*
(Continued)

*Primary Examiner* — Michael Colucci
(74) *Attorney, Agent, or Firm* — Birch, Stewart, Kolasch & Birch, LLP

(57) ABSTRACT

A method for controlling an artificial intelligence (AI) device can include obtaining a video sample of a user and an audio sample of the user, generating, via a neural network, a visual embedding based on the video sample and an audio embedding based on the audio sample, the visual embedding and the audio embedding being multi-dimensional vectors, generating, via the neural network, an audio-visual embedding based on a combination of the visual and audio embeddings. The method can further include determining a specific pre-enrolled audio-visual embedding from among pre-enrolled audio-visual embeddings corresponding pre-enrolled users based on a distance away from the audio-visual embedding within a joint audio-visual subspace and verifying the user as the specific pre-enrolled user. Also, the neural network can be trained based on a loss function that uses a plurality of audio-visual embeddings, each including an audio component and a visual component.

14 Claims, 6 Drawing Sheets

(51) Int. Cl.
*G06V 10/82* (2022.01)
*G06V 40/50* (2022.01)
*G06V 40/70* (2022.01)
*G10L 17/04* (2013.01)
*G10L 17/18* (2013.01)

(52) U.S. Cl.
CPC .............. *G06V 40/70* (2022.01); *G10L 17/04* (2013.01); *G10L 17/18* (2013.01)

(56) References Cited

U.S. PATENT DOCUMENTS

2021/0350786 A1* 11/2021 Chen ..................... G10L 15/063
2023/0107741 A1* 4/2023 Saraf ....................... G10L 17/26 704/200
2024/0160849 A1* 5/2024 Fanelli .................... G06F 40/30
2024/0303431 A1* 9/2024 Annadi ................... G06F 40/40
2025/0006175 A1* 1/2025 Coppo .................... G10L 25/60

OTHER PUBLICATIONS

Peiwen Sun et al. "Learning Audio-Visual Embedding for Person Verification in the Wild", arXiv:2209.04093v2 [cs. CV] Oct. 26, 2022, 5 pages.
Ruijie Tao et al., "Audio-visual Speaker Recognition with a Cross-modal Discriminative Network", arXiv:2008.03894v1 [eess.AS] Aug. 10, 2020, 5 pages.
Yanmin Qian et al., "Audio-Visual Deep Neural Network for Robust Person Verification", Journal of Latex Class Files, vol. 14, No. 8, Aug. 2015, 15 pages.
Zhengyang Chen et al., "Multi-modality Matters: A Performance Leap on VoxCeleb" Interspeech 2020, Oct. 25-29, 2020, pp. 2252-2256.

* cited by examiner

ARTIFICIAL INTELLIGENCE DEVICE FOR ROBUST MULTIMODAL ENCODER FOR PERSON REPRESENTATIONS AND CONTROL METHOD THEREOF

CROSS-REFERENCE TO RELATED APPLICATIONS

This non-provisional application claims priority under 35 U.S.C. § 119 (e) to U.S. Provisional Application No. 63/459,257, filed on Apr. 13, 2023, the entirety of which is hereby expressly incorporated by reference into the present application.

BACKGROUND

Field

The present disclosure relates to a robust multimodal encoder device for person representations and method, in the field of artificial intelligence (AI). Particularly, the method can provide audio-visual speaker verification that achieves identity-discriminative and generalizable speaker representations, in the AI field.

Discussion of the Related Art

Artificial intelligence (AI) continues to transform various aspects of society and helps users more efficiently retrieve and access information whether in the form of question and answering systems or recommendations systems.

The interaction between humans and AI systems has surged in popularity and adoption, particularly as these systems evolve to handle complex tasks and seamlessly integrate into peoples' daily routines, such as digital voice assistants, robots and Smart Home technologies.

However, there are notable deficiencies in systems regarding the capabilities of delivering personalized experiences in multi-user settings. Many digital home assistants, for instance, are designed with a single-user assumption, resulting in an inability to offer tailored recommendations in multi-user environments. This is because such assistants disregard individual user profiles, focusing solely on speech content to deliver generic responses.

Consequently, these systems often capture a blurred user profile during multi-user interactions, limiting their capacity to provide targeted responses (e.g., an individual parent's preferences may become mixed or obfuscated with the preferences of his or her children). The inability to distinguish between speakers leads to missed opportunities for accurate recommendations, empathetic conversations, and user-specific preferences.

In addition, these systems are often impaired by environmental noise and occlusion, and have reliability issues associated with performing speaker verification in real-world settings.

Thus, there exists a need for improved speaker recognition that is generalizable and capable of robust person representation, which can be used as a biometric for downstream applications, supporting personalized content to the user and improving the user experience with digital devices.

In addition, there exists a need for speaker recognition that can better handle noisy data, provide enhanced immunity against outliers, and maintain performance by being capable of handling missing or corrupt input modalities.

Also, there exists a need for providing improved audio-visual speaker recognition, enabling fail-safe and reliable means to identify users in a multi-user environment, and providing more human-like interactions with machines and personalized services for multi-user interactions.

SUMMARY OF THE DISCLOSURE

The present disclosure has been made in view of the above problems and it is an object of the present disclosure to provide a device and method that can provide an audio-visual speaker verification device and method, in the field of artificial intelligence (AI). Further, the method can provide audio-visual speaker verification that achieves identity-discriminative and generalizable speaker representations.

An object of the present disclosure is to provide a method for controlling an artificial intelligence (AI) device that includes acquiring a facial crop based on frames of video data and an audio sample of an individual's speech to generate an audio embedding and a visual embedding, and inputting the audio embedding and the visual embedding into a multimodal fusion module to generate a single audio-visual embedding representation, in which the audio-visual embedding representation encapsulates the individual's biometric characteristics and can serve various applications and downstream tasks including speaker verification (e.g., determining if the speaker matches a pre-enrolled user) or speaker identification (e.g., recognizing the speaker based on a pre-enrolled identity).

Another object of the present disclosure to provide a method for controlling an artificial intelligence (AI) device that includes obtaining, via a processor in the AI device, a video sample of a user and an audio sample of the user, generating, via a neural network, a visual embedding based on the video sample and an audio embedding based on the audio sample, the visual embedding and the audio embedding being multi-dimensional vectors, generating, via the neural network, an audio-visual embedding based on a combination of the visual embedding and the audio embedding, determining, via the processor, a specific pre-enrolled audio-visual embedding from among a plurality of pre-enrolled audio-visual embeddings corresponding pre-enrolled users that has a shortest distance away from the audio-visual embedding within a joint audio-visual subspace, and verifying, via the processor, the user as the specific pre-enrolled user, in which the neural network is trained based on a loss function that uses a plurality of audio-visual embeddings, each of the plurality of audio-visual embeddings includes an audio component and a visual component.

It is another object of the present disclosure to provide a method for controlling an artificial intelligence (AI) device that includes outputting personalized content for the user based on the verifying the user as the specific pre-enrolled user.

An object of the present disclosure is to provide a method for controlling an artificial intelligence (AI) device in which the loss function further includes an age component.

It is another object of the present disclosure to provide a method for controlling an artificial intelligence (AI) device in which the loss function is defined by equation: $L_{MTL}=\gamma\cdot L_G(S)+(1-\gamma)\cdot L_{AUX}$, where $L_{MTL}$ is the combined multi-task loss, $L_G$ is the GE2E-MM loss, $L_{AUX}$ is the auxiliary task loss, S is based on a similarity matrix for determining similarities between the plurality of audio-visual embeddings, and $\gamma$ is a scalar weight.

Another object of the present disclosure is to provide a method for controlling an artificial intelligence (AI) device in which the video sample includes a face track cropping of the user including a plurality of frames, and the audio sample includes a recording of a voice of the user.

An object of the present disclosure is to provide a method for controlling an artificial intelligence (AI) device that includes training the neural network based on batching N×M audio and visual inputs to update weights of the neural network, where N and M correspond to unique speakers and unique audio-visual utterances for each of the unique speakers, respectively.

It is another object of the present disclosure to provide a method for controlling an artificial intelligence (AI) device that includes training the neural network based on a data augmentation technique that includes obtaining a first audio sample and a first visual sample of a same speaker captured during a first time period and a second audio sample and a second visual sample of the same speaker captured during a second time period after the first time period, and generating a first mixed audio-visual pair including the first audio sample and the second visual sample of the same speaker and a second mixed audio-visual pair including the second audio sample and the first visual sample of the same speaker.

Another object of the present disclosure is to provide a method for controlling an, artificial intelligence (AI) device that includes transforming, via the neural network, the audio embedding into a projected audio embedding projected onto the joint audio-visual subspace, transforming, via the neural network, the visual embedding into a projected visual embedding projected onto the joint audio-visual subspace, multiplying, via the neural network, the projected audio embedding by a voice attention weight to generate a weighted audio embedding, multiplying, via the neural network, the projected visual embedding by a face attention weight to generate a weighted visual embedding and summing, via the neural network, the weighted audio embedding and the weighted visual embedding to generate the audio-visual embedding corresponding to the user.

It is another object of the present disclosure to provide a method for controlling an artificial intelligence (AI) device in which the voice attention weight added to face attention weight equal 1.

An object of the present disclosure is to provide an artificial intelligence (AI) device for audio-visual speaker verification that includes a memory configured to store a plurality of pre-enrolled audio-visual embeddings corresponding pre-enrolled users, and a controller configured to obtain a video sample of a user and an audio sample of the user, generate, via a neural network, a visual embedding based on the video sample and an audio embedding based on the audio sample, the visual embedding and the audio embedding being multi-dimensional vectors, generate, via the neural network, an audio-visual embedding based on a combination of the visual embedding and the audio embedding, determine a specific pre-enrolled audio-visual embedding from among the plurality of pre-enrolled audio-visual embeddings corresponding the pre-enrolled users that has a shortest distance away from the audio-visual embedding within a joint audio-visual subspace, and verify the user as the specific pre-enrolled user, in which the neural network is trained based on a loss function that uses a plurality of audio-visual embeddings, each of the plurality of audio-visual embeddings includes an audio component and a visual component.

In addition to the objects of the present disclosure as mentioned above, additional objects and features of the present disclosure will be clearly understood by those skilled in the art from the following description of the present disclosure.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

DETAILED DESCRIPTION OF THE EMBODIMENTS

Figure 1:
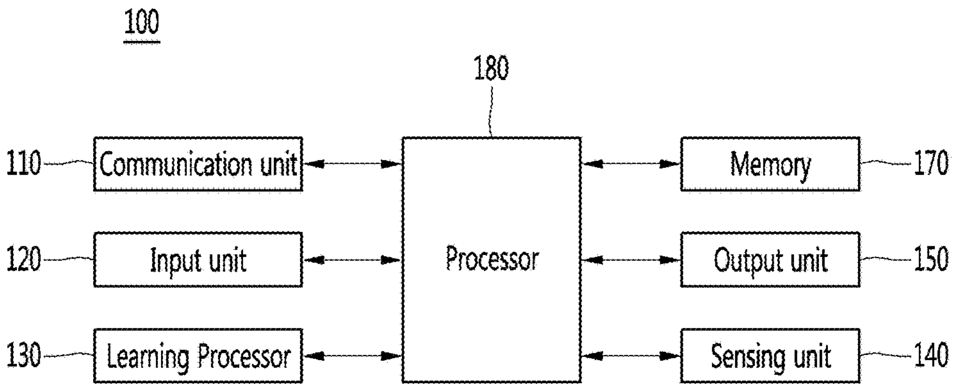
FIG. 1 illustrates an AI device according to an embodiment of the present disclosure.

Reference will now be made in detail to the embodiments of the present disclosure, examples of which are illustrated in the accompanying drawings.

Wherever possible, the same reference numbers will be used throughout the drawings to refer to the same or like parts.

Advantages and features of the present disclosure, and implementation methods thereof will be clarified through following embodiments described with reference to the accompanying drawings.

The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details.

Like reference numerals refer to like elements throughout. In the following description, when the detailed description of the relevant known function or configuration is determined to unnecessarily obscure the important point of the present disclosure, the detailed description will be omitted.

In a situation where “comprise,” “have,” and “include” described in the present specification are used, another part can be added unless “only” is used. The terms of a singular form can include plural forms unless referred to the contrary.

In construing an element, the element is construed as including an error range although there is no explicit description. In describing a position relationship, for example, when a position relation between two parts is described as “on,” “over,” “under,” and “next,” one or more other parts can be disposed between the two parts unless ‘just’ or ‘direct’ is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms.

These terms are only used to distinguish one element from another. For example, a first element could be termed a second element, and, similarly, a second element could be termed a first element, without departing from the scope of the present disclosure.

Further, "X-axis direction," "Y-axis direction" and "Z-axis direction" should not be construed by a geometric relation only of a mutual vertical relation and can have broader directionality within the range that elements of the present disclosure can act functionally.

The term "at least one" should be understood as including any and all combinations of one or more of the associated listed items.

For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, the preferred embodiments of the present disclosure will be described in detail with reference to the accompanying drawings. All the components of each device or apparatus according to all embodiments of the present disclosure are operatively coupled and configured.

Artificial intelligence (AI) refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which can be implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can include a vehicle having only an internal combustion engine, a hybrid vehicle having an internal combustion engine and an electric motor together, and an electric vehicle having only an electric motor, and can include not only an automobile but also a train, a motorcycle, and the like.

At this time, the self-driving vehicle can be regarded as a robot having a self-driving function.

FIG. 1 illustrates an artificial intelligence (AI) device 100 according to one embodiment.

The AI device 100 can be implemented by a stationary device or a mobile device, such as a television (TV), a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot (e.g., a home robot), a vehicle, and the like. However, other variations are possible.

Referring to FIG. 1, the AI device 100 can include a communication unit 110 (e.g., transceiver), an input unit 120 (e.g., touchscreen, keyboard, mouse, microphone, etc.), a learning processor 130, a sensing unit 140 (e.g., one or more sensors or one or more cameras), an output unit 150 (e.g., a display or speaker), a memory 170, and a processor 180 (e.g., a controller).

The communication unit 110 (e.g., communication interface or transceiver) can transmit and receive data to and from external devices such as other AI devices 100*a* to 100*e* and the AI server 200 (e.g., FIGS. 2 and 3) by using wire/wireless communication technology. For example, the communication unit 110 can transmit and receive sensor information, a user input, a learning model, and a control signal to and from external devices.

The communication technology used by the communication unit 110 can include GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can acquire various kinds of data.

At this time, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using a learning model. The input unit 120 can acquire raw input data. In this situation, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to infer a result value for new input data rather than learning data, and the inferred value can be used as a basis for determination to perform a certain operation.

At this time, the learning processor 130 can perform AI processing together with the learning processor 240 of the AI server 200.

In addition, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR (infrared) sensor, a fingerprint recognition sensor, an ultrasonic sensor, an optical sensor, a camera, a microphone, a lidar, and a radar.

The output unit 150 can generate an output related to a visual sense, an auditory sense, or a haptic sense.

At this time, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can provide audio-visual speaker verification in an open-set multi-user environment and can generate a biometric which can be used for downstream tasks, e.g., authentication, a question and answering system or a recommendation system with personalized services.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire information for the user input and can perform speaker verification and determine an answer or a recommended item or action based on the acquired information.

The processor 180 can acquire the information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200 (see FIG. 2), or can be learned by their distributed processing.

The processor 180 can collect history information including user profile information, the operation contents of the AI device 100 or the user's feedback on the operation and can store the collected history information in the memory 170 or the learning processor 130 or transmit the collected history information to the external device such as the AI server 200. The collected history information can be used to update the learning model.

In addition, the AI device 100 can obtain or store a knowledge graph, which can include a web of interconnected facts and entities (e.g., a web of knowledge). A knowledge graph is a structured way to store and represent information, capturing relationships between entities and concepts in a way that machines can understand and reason with.

According to an embodiment, the AI device 100 can include one or more knowledge graphs that include entities and properties or information about people or items (e.g., names, user IDs), products (e.g., display devices, home appliances, etc.), profile information (e.g., age, gender, weight, location, etc.), recipe categories, ingredients, images, purchases and reviews.

The knowledge graph can capture real world knowledge in the form of a graph structure modeled as (h, r, t) triplets where h and t refer to a head entity and a tail entity respectively, and r is a relationship that connects the two entities.

Also, knowledge graph completion can refer to a process of filling in missing information in a knowledge graph, making it more comprehensive and accurate (e.g., similar to piecing together a puzzle, uncovering hidden connections and expanding the knowledge base). Link prediction can identify missing links in a knowledge graph (KG) and assist with downstream tasks such as question answering and recommendation systems.

The processor 180 can control at least part of the components of AI device 100 to drive an application program stored in memory 170. Furthermore, the processor 180 can operate two or more of the components included in the AI device 100 in combination to drive the application program.

Figure 2:
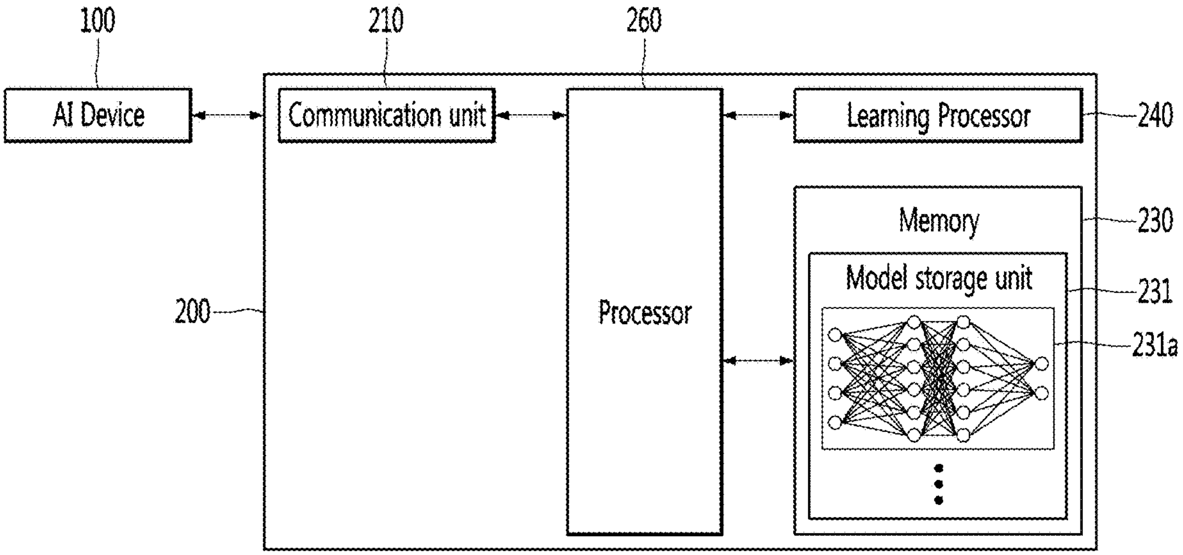
FIG. 2 illustrates an AI server according to an embodiment of the present disclosure.

FIG. 2 illustrates an AI server according to one embodiment.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network, 6G network or other communications network. At this time, the AI server 200 can be included as a partial configuration of the AI device 100, and can perform at least part of the AI processing together.

The AI server 200 can include a communication unit 210, a memory 230, a learning processor 240, a processor 260, and the like.

The communication unit 210 can transmit and receive data to and from an external device such as the AI device 100.

The memory 230 can include a model storage unit 231. The model storage unit 231 can store a learning or learned model (or an artificial neural network 231*a*) through the learning processor 240.

The learning processor 240 can learn the artificial neural network 231*a* by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in the memory 230.

The processor 260 can infer the result value for new input data by using the learning model and can generate a response or a control command based on the inferred result value.

Figure 3:
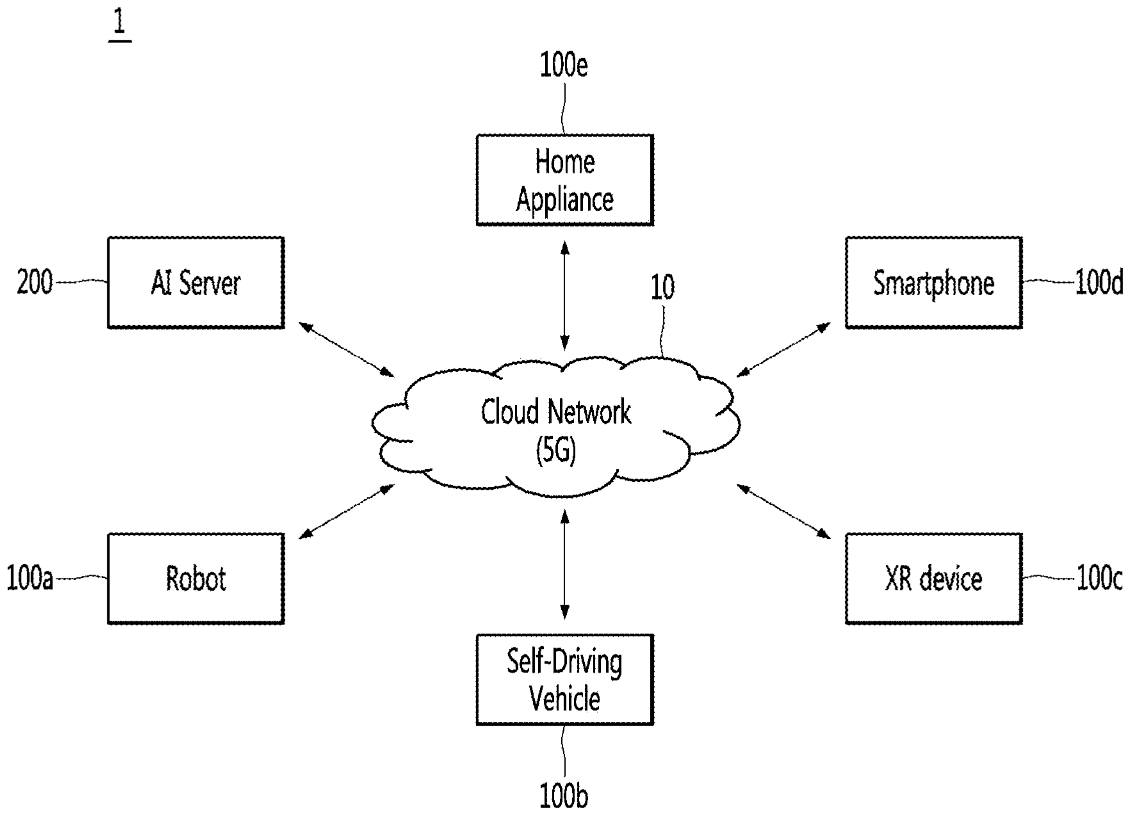
FIG. 3 illustrates an AI device according to an embodiment of the present disclosure.

FIG. 3 illustrates an AI system 1 including a terminal device according to one embodiment.

Referring to FIG. 3, in the AI system 1, at least one of an AI server 200, a robot 100*a*, a self-driving vehicle 100*b*, an XR (extended reality) device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, can be referred to as AI devices 100*a* to 100*e*. The AI server 200 of FIG. 3 can have the configuration of the AI server 200 of FIG. 2.

According to an embodiment, the speaker verification method can be implemented as an application or program that can be downloaded or installed in the smartphone 100*d*, which can communicate with the AI server 200, but embodiments are not limited thereto.

The cloud network 10 can refer to a network that forms part of a cloud computing infrastructure or exists in a cloud computing infrastructure. The cloud network 10 can be configured by using a 3G network, a 4G or LTE network, a 5G network, a 6G network, or other network.

For instance, the devices 100*a* to 100*e* and 200 configuring the AI system 1 can be connected to each other through the cloud network 10. In particular, each of the devices 100*a* to 100*e* and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and can assist at least part of AI processing of the connected AI devices 100*a* to 100*e*.

At this time, the AI server 200 can learn the artificial neural network according to the machine learning algorithm instead of the AI devices 100*a* to 100*e*, and can directly store the learning model or transmit the learning model to the AI devices 100*a* to 100*e*.

At this time, the AI server 200 can receive input data from the AI devices 100*a* to 100*e*, can infer the result value for the received input data by using the learning model, can generate a response or a control command based on the inferred result value, and can transmit the response or the control command to the AI devices 100*a* to 100*e*. Each AI device 100*a* to 100*e* can have the configuration of the AI device 100 of FIGS. 1 and 2 or other suitable configurations.

Alternatively, the AI devices 100*a* to 100*e* can infer the result value for the input data by directly using the learning model, and can generate the response or the control command based on the inference result.

Hereinafter, various embodiments of the AI devices 100*a* to 100*e* to which the above-described technology is applied will be described. The AI devices 100*a* to 100*e* illustrated in FIG. 3 can be regarded as a specific embodiment of the AI device 100 illustrated in FIG. 1.

According to an embodiment, the home appliance 100*e* can be a smart television (TV), smart microwave, smart oven, smart refrigerator or other display device, which can implement one or more of a speaker verification method, a question and answering system, and/or a recommendation system. The method can be the form of an executable application or program.

The robot 100*a*, to which the AI technology is applied, can be implemented as a smart Home robot, an entertainment robot, a guide robot, a carrying robot, a cleaning robot, a wearable robot, a pet robot, an unmanned flying robot, or the like.

The robot 100*a* can include a robot control module for controlling the operation, and the robot control module can refer to a software module or a chip implementing the software module by hardware.

The robot 100*a* can acquire state information about the robot 100*a* by using sensor information acquired from various kinds of sensors, can detect (recognize) surrounding environment and objects, can generate map data, can determine the route and the travel plan, can determine the response to user interaction, or can determine the operation.

The robot 100*a* can use the sensor information acquired from at least one sensor among the lidar, the radar, and the camera to determine the travel route and the travel plan.

The robot 100*a* can perform the above-described operations by using the learning model composed of at least one artificial neural network. For example, the robot 100*a* can recognize the surrounding environment and the objects by using the learning model, and can determine the operation by using the recognized surrounding information or object information. The learning model can be learned directly from the robot 100*a* or can be learned from an external device such as the AI server 200.

At this time, the robot 100*a* can perform the operation by generating the result by directly using the learning model, but the sensor information can be transmitted to the external device such as the AI server 200 and the generated result can be received to perform the operation.

The robot 100*a* can use at least one of the map data, the object information detected from the sensor information, or the object information acquired from the external apparatus to determine the travel route and the travel plan, and can control the driving unit such that the robot 100*a* travels along the determined travel route and travel plan. Further, the robot 100*a* can determine an action to pursue or an item to recommend, or generate a response in reply to a user utterance or conversation. Also, the robot 100*a* can generate an answer in response to a user query. The answer can be in the form of natural language.

The map data can include object identification information about various objects arranged in the space in which the robot 100*a* moves. For example, the map data can include object identification information about fixed objects such as walls and doors and movable objects such as pollen and desks. The object identification information can include a name, a type, a distance, and a position.

In addition, the robot 100*a* can perform the operation or travel by controlling the driving unit based on the control/interaction of the user. At this time, the robot 100*a* can acquire the intention information of the interaction due to the user's operation or speech utterance, and can determine the response based on the acquired intention information, and can perform the operation.

The robot 100*a*, to which the AI technology and the self-driving technology are applied, can be implemented as a guide robot, a home robot, a carrying robot, a cleaning robot (e.g., an automated vacuum cleaner), a wearable robot, an entertainment robot, a pet robot, an unmanned flying robot (e.g., a drone or quadcopter), or the like.

The robot 100*a*, to which the AI technology and the self-driving technology are applied, can refer to the robot itself having the self-driving function or the robot 100*a* interacting with the self-driving vehicle 100*b*.

The robot 100*a* having the self-driving function can collectively refer to a device that moves for itself along the given movement line without the user's control or moves for itself by determining the movement line by itself.

The robot 100*a* and the self-driving vehicle 100*b* having the self-driving function can use a common sensing method to determine at least one of the travel route or the travel plan. For example, the robot 100*a* and the self-driving vehicle 100*b* having the self-driving function can determine at least one of the travel route or the travel plan by using the information sensed through the lidar, the radar, and the camera.

The robot 100*a* that interacts with the self-driving vehicle 100*b* exists separately from the self-driving vehicle 100*b* and can perform operations interworking with the self-driving function of the self-driving vehicle 100*b* or interworking with the user who rides on the self-driving vehicle 100*b*.

In addition, the robot 100*a* interacting with the self-driving vehicle 100*b* can control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* can monitor the user boarding the self-driving vehicle 100*b*, or can control the function of the self-driving vehicle 100*b* through the interaction with the user. For example, when it is determined that the driver is in a drowsy state, the robot 100*a* can activate the self-driving function of the self-driving vehicle 100*b* or assist the control of the driving unit of the self-driving vehicle 100*b*. The function of the self-driving vehicle 100*b* controlled by the robot 100*a* can include not only the self-driving function but also the function provided by the navigation system or the audio system provided in the self-driving vehicle 100*b*.

Alternatively, the robot 100*a* that interacts with the self-driving vehicle 100*b* can provide information or assist the function to the self-driving vehicle 100*b* outside the self-driving vehicle 100*b*. For example, the robot 100*a* can provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

According to an embodiment, the AI device 100 can provide audio-visual speaker verification that achieves identity-discriminative and generalizable speaker representations. Speaker verification is the process of verifying whether an utterance belongs to a specific speaker, based on that speaker's known or prior utterances (e.g., enrollment utterances).

According to another embodiment, the AI device 100 can be integrated into an infotainment system of the self-driving vehicle 100*b*, which can provide speaker verification in a multi-user environment and recommend content or provide answers based on various input modalities, the content can include one or more of audio recordings, video, music, pod casts, etc., but embodiments are not limited thereto. Also, the AI device 100 can be integrated into an infotainment system of the manual or human-driving vehicle.

Identifying a specific speaker in a multi-user environment is a prevalent challenge in the field of person verification using AI, especially when only audio information is used for the speaker verification. Humans often use multiple senses when identifying or differentiating a specific person from other people. For example, humans often use visual clues of a speaker's face or body in addition to listening to audible sounds with their ears when verifying or determining who is speaking.

In view of this, the AI device 100 can leverage multi-sensory associations for the task of speaker or person verification by integrating individual audio and visual modalities to generate a biometric and perform various tasks. For example, the generated biometric information can be used for various downstream tasks, such as supporting personalized content and recommendations to the user, login and authentication functions, and improving the user experience with digital devices.

Figure 4:
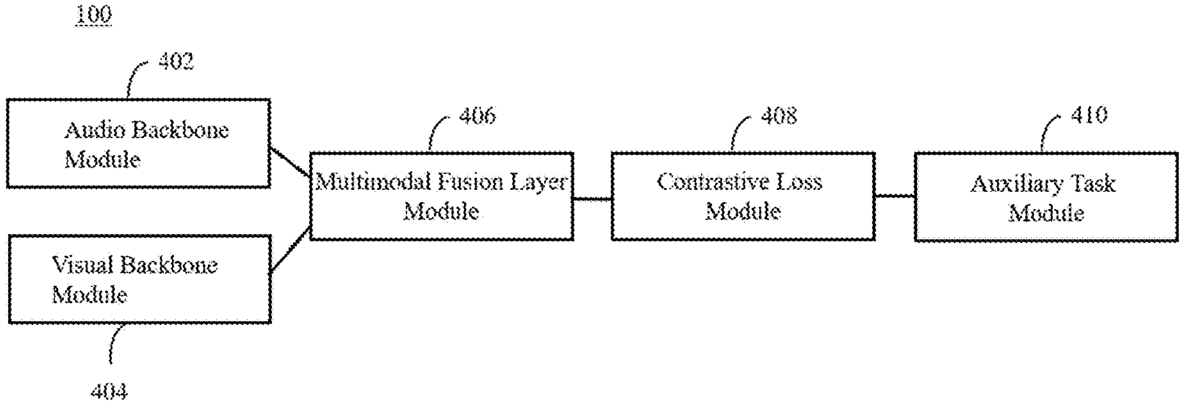
FIG. 4 shows an overview of components in the AI device, according to an embodiment of the present invention.

FIG. 4 illustrates an example overview of the audio-visual architecture that can be included in the AI device 100, according to an embodiment. For example, the AI device 100 can include a combination of an audio backbone module 402, a visual backbone module 404, a multimodal fusion layer module 460 (e.g., fusion layer), a contrastive loss module 408 for multimodal inputs (e.g., using a N-dimensional multimodal representation), and an auxiliary task module 410 (e.g., training heads including an auxiliary head) for providing a multi-task learning strategy for achieving refined person or speaker representations, which will be described in more detail below.

The multimodal fusion layer module 460 can include an Attention-based Fusion Neural Network (AFNN) that outputs an audio-visual embedding based on a combination of a visual embedding and an audio embedding. The audio-visual embedding can be used as a biometric of the user or a biometric of the person who is speaking to the AI device 100. The biometric can be used for various downstream tasks, such as speaker verification, login and authentication applications and personalized question and answering systems.

In addition, after the AFNN in the multimodal fusion layer module 460 has been properly trained on one or more data training sets and its weights have been updated, then the contrastive loss module 408 (e.g., including GE2E-MM) and the auxiliary task module 410 can be removed or bypassed during inference time.

In other words, the weights of the AFNN can be adjusted through training, and the result is that the trained AFNN can generate a multi-modal embedding as a biometric that best represents a user's audio/visual identity. For example, the AI device 100 can use this biometric to recognize and understand who it is that is interacting with the AI device 100.

Figure 5:
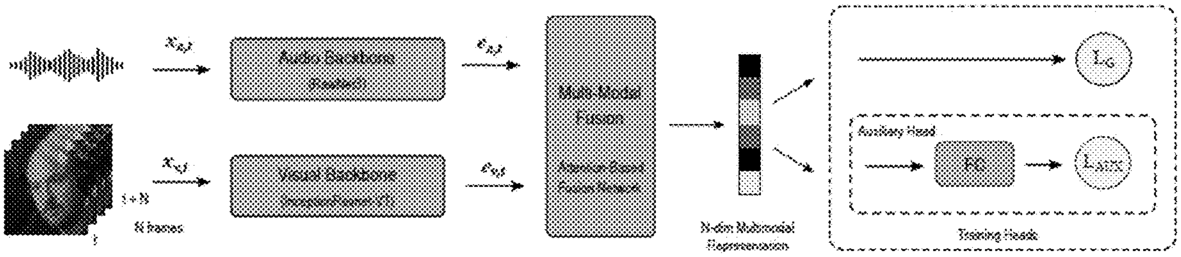
FIG. 5 illustrates a detailed view of components within the AI device, according to an embodiment of the present invention.

Also, FIG. 5 shows a more detailed view of the components within the high level overview of the audio-visual architecture shown in FIG. 4.

The training head (e.g., shown in dashed lines) can be removed during inference time. The auxiliary task module can further enhance the training of the model based on additional features for refinement, such as age. Also, according to an embodiment, the N-dimensional multimodal representation can be used directly for speaker verification during inference time.

Figure 6:
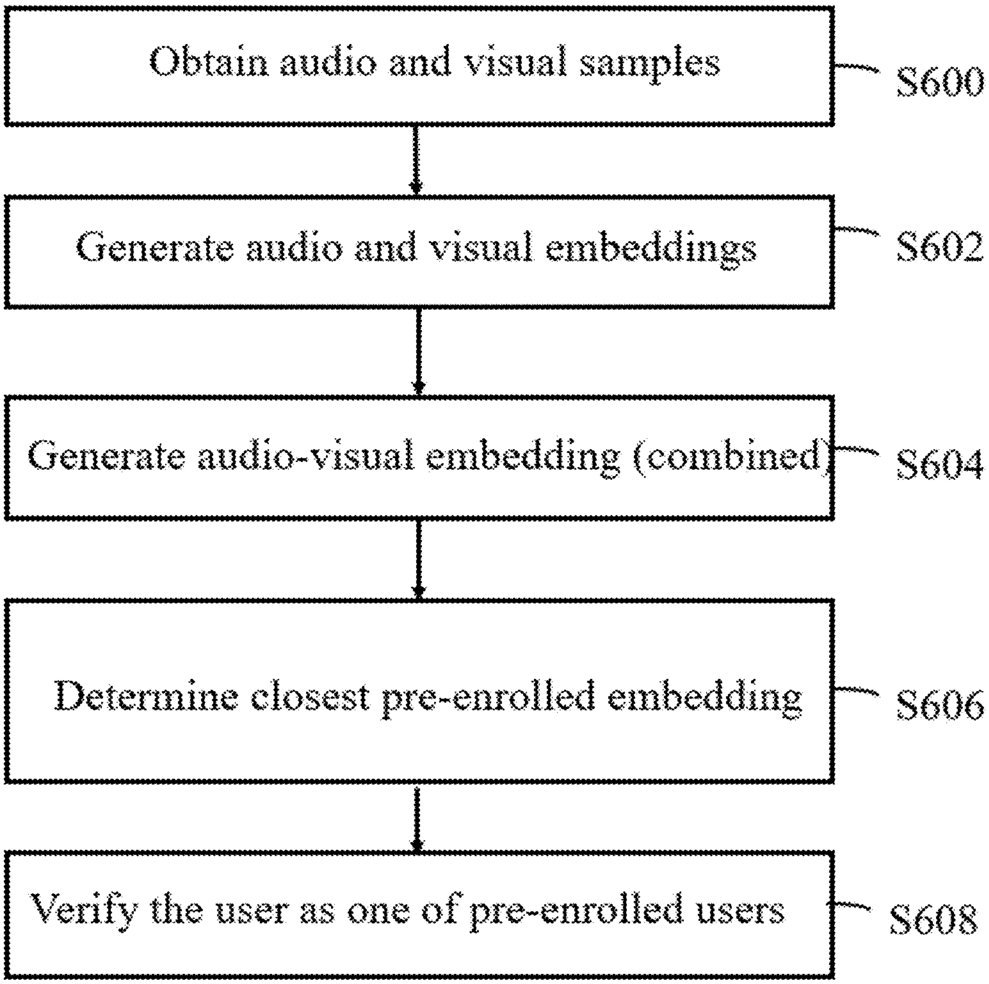
FIG. 6 shows an example flow chart for a method in the AI device, according to an embodiment of the present invention.

FIG. 6 shows an example flow chart of a method according to an embodiment. For example, the AI device 100 can be configured with a method that includes obtaining, via a processor in the AI device 100, a cropped face track video sample of a user and an audio sample of the user (e.g., S600), generating, via a neural network (e.g., AFNN), a visual embedding based on the video sample and an audio embedding based on the audio sample (e.g., S602), in which the visual embedding and the audio embedding are multi-dimensional vectors, and generating, via the neural network, an audio-visual embedding based on a combination of the visual embedding and the audio embedding (e.g., S604). The method can further include determining, via the processor, a specific pre-enrolled audio-visual embedding from among a plurality of pre-enrolled audio-visual embeddings corresponding pre-enrolled users based on a shortest distance away from the audio-visual embedding within a joint audio-visual subspace (e.g., S606), and verifying, via the processor, the user as the specific pre-enrolled user (e.g., S608), in which the neural network is trained based on a loss function that uses a plurality of audio-visual embeddings, each of the plurality of audio-visual embeddings includes an audio component and a visual component.

According to an embodiment, the specific pre-enrolled audio-visual embedding selected from among the plurality of pre-enrolled audio-visual embeddings corresponding pre-enrolled users can be selected based on the pre-enrolled audio-visual embedding that is a shortest distance away from the audio-visual embedding within a joint audio-visual subspace, but embodiments are not limited thereto. Also, the specific pre-enrolled audio-visual embedding selected from among the plurality of pre-enrolled audio-visual embeddings corresponding pre-enrolled users can be selected based on a threshold value corresponding to a threshold distance away from the generated audio-visual embedding, in which if a distance between pre-enrolled audio-visual embedding and the generated audio-visual embedding (e.g., of the current user) is less than the threshold value, then that pre-enrolled audio-visual embedding can be considered as a hit for matching with the generated audio-visual embedding.

In more detail, with reference again to FIG. 5, during interference time, the AI device 100 can use a camera to capture video of a user and a microphone to record audio from the user, such as the user's voice input. The video data can include images of the user's face, such as a cropping of the user's face, which can be sampled many times per second (e.g., N frames). Also, the audio data can include a sample recording of the user, such as a snippet of the user's speech (e.g., a 10-30 second audio recording).

According to another embodiment, the video data and the audio data can be captured by an external device and transmitted to the AI device 100 for processing and speaker verification. Also, during training, the AI device 100 can be trained on over one million audio/video utterances from thousands of different speakers, such as the VoxCeleb2 dataset. The training of the AI device 100 will be discussed in more detail later.

As shown in FIG. 5, the AI device 100 can obtain a raw audio sample $x_{a,t}$ and a raw video sample $x_{v,t}$ which can be respectively processed by an audio backbone and a visual backbone to generate an audio embedding $e_{a,t}$ and a visual embedding $e_{v,t}$ corresponding to that user input. For example, the audio embedding $e_{a,t}$ and the visual embedding $e_{v,t}$ can be multi-dimensional vectors.

For example, according to an embodiment, the audio backbone and the visual backbone can be pre-trained neural networks whose weights remain frozen, while the weights of the Attention-based Fusion Neural Network (AFNN) are updated during training based on a loss function, which is described in more detail at a later section.

In addition, the audio backbone can be RawNet3 which is a deep neural network model that receives raw audio waveforms and can be used to extract the audio embedding $e_{a,t}$ and the visual backbone can be InceptionResNet-v1 which is a deep convolutional neural network that receives an RGB image and can generate a vector embedding, but embodiments are not limited thereto. For example, according to design choice and various implementations, other types of neural networks can be used to generate the audio embedding $e_{a,t}$ and the visual embedding $e_{v,t}$.

Also, according to another embodiment, the audio embedding $e_{a,t}$ and the voice embedding $e_{v,t}$ can be generated by an external device and supplied to the AI device 100 for processing and speaker verification.

In addition, the AI device 100 includes a multimodal fusion layer module (e.g., fusion layer) to integrate the individual audio and visual modalities. For example, the fusion layer receives the audio embedding $e_{a,t}$ and the visual embedding $e_{v,t}$. For improved robustness, the fusion layer can handle missing modalities and/or corrupt data. For example, the fusion layer can include an attention-based neural network fusion layer, which can be referred to as an Attention-based Fusion Neural Network (AFNN).

The AFNN can use attention weights that are dynamically applied to scale modality embeddings prior to aggregation, which can naturally deal with corruption or a missing modality, by reducing the contribution of either modality during the time of fusion.

For example, the AFNN is able to adapt to corrupt or missing modalities by re-weighing the contribution of either modality at the time of fusion. This is achieved through an attention mechanism that is extended across the modality axis to obtain modality attention weights, which is described in more detail below.

For example, for implementation of the AFNN, a 512 dimension face embedding and a 256 dimension voice embedding obtained from their corresponding pre-trained models can be L2 normalized and transformed independently into a 512 dimension space for equal representation prior to fusion, but embodiments are not limited thereto. According to an embodiment, this transformation can include two linear layers, with a ReLU activation and batch normalization layer in between. The attention layer can be implemented as a linear layer with an input size of 1024 and output of 2 to represent the modality scores, but embodiments are not limited thereto. Further, the softmaxed scores can applied as multiplicative factors (e.g., $\alpha_{face}$, $\alpha_{voice}$) to the transformed representations (e.g., $\tilde{e}_{face}$, $\tilde{e}_{voice}$), which can then concatenated to form the multimodal representation (e.g., $e_{multimodal}$).

Figure 7:
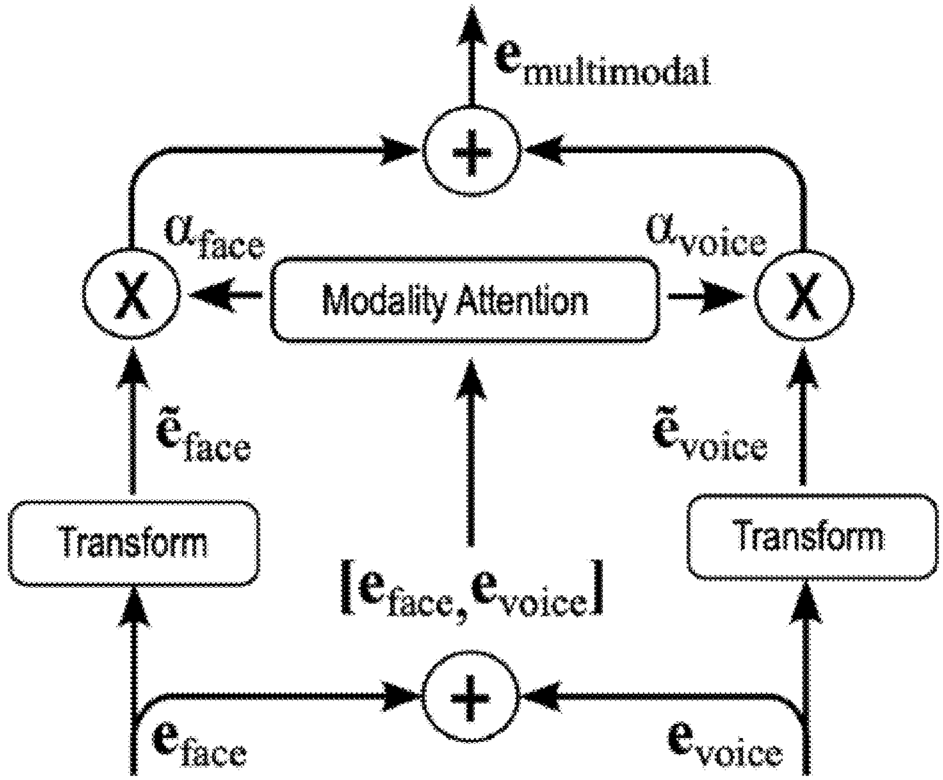
FIG. 7 illustrates components of an Attention-based Fusion Neural Network (AFNN) included in the AI device, according to an embodiment of the present invention.

In more detail, FIG. 7 shows components of the Attention-based Fusion Neural Network (AFNN) included in the multimodal fusion layer module, according to an embodiment of the present disclosure. For example, the multimodal fusion layer module can receive the audio embedding $e_{a,t}$ (e.g., $e_{voice}$) and the visual embedding $x_{v,t}$ (e.g., $e_{face}$) from the audio and visual backbones, and transform the audio embedding $e_{voice}$ into a projected audio embedding $\tilde{e}_{voice}$ and transform the visual embedding $e_{face}$ into a projected visual embedding $\tilde{e}_{face}$.

According to an embodiment, the projected embeddings can be produced by stacking fully connected FC layers on top of the respective embeddings, $e_{voice}$ and $e_{face}$, but embodiments are not limited thereto. For example, the projected embeddings $\tilde{e}_{face}$ and $\tilde{e}_{voice}$ can be projected onto a joint audio-visual subspace. The joint audio-visual subspace can capture relationships between the audio and video data, which can be used for various downstream tasks.

In addition, as shown in FIG. 7, the audio embedding $e_{voice}$ and the visual embedding $e_{face}$ are also combined by the summation operation and the summation result is input to the modality attention component, which assigns scores or attentions weights that are dynamically applied to scale the projected embeddings prior to aggregation of creating the combined multimodal embedding $e_{multimodal}$ (e.g., using Equation 1, discussed below).

For example, prior to aggregation, each of the projected embeddings is multiplied by a corresponding attention weight. The two attention weights can be normalized so they add up to 1 (e.g., (0.4, 0.6), (0.8, 0.2), etc.). In other words, the attention function decides how much attention should be given to the two different modalities (e.g., the voice component and the face component).

In other words, the Attention-based Fusion Neural Network (AFNN) is able to adapt to corrupt or missing modalities by dynamically re-weighing the contribution of either modality at the time of fusion. This is achieved through the attention mechanism (e.g., "modality attention" component in FIG. 6) that is extended across the modality axis to obtain modality attention weights according to Equation 1 below.

[Equation 1]

$$\hat{a}_{\{f,v\}} = f_{att}([e_f, e_v]) = W^T[e_f, e_v] + b, \qquad (1)$$

In Equation 1, $e_{f\ and}$ $e_v$ are the face embedding (e.g., visual embedding) and the voice embedding (e.g., audio embedding), respectively. Also, $W^T$ and b are learnable parameters that are optimized during the training process.

In addition, with reference to Equations 2 and 3 below, the global attention weights can be re-scaled via Softmax to obtain scores between [0, 1] and applied across the embedding axis.

[Equation 2]

$$e_{fused} = \sum_{i\in\{f,v\}} \alpha_i e_i, \qquad (2)$$

where

[Equation 3]

$$\alpha_i = \frac{\exp(\hat{a}_i)}{\sum_{k\in\{f,v\}} \exp(\hat{a}_k)}, \qquad (3)$$

$$i \in \{f, v\}$$

In Equation 2, α is the normalized version of the attention weight produced by Equation 1, and the summation of $e_i$ represents going through and summing each of the face and voice embeddings (e.g., f, v) resulting in the fused embedding. Also, Equation 3 is the Softmax equation that is applied to normalize the corresponding attention weights. Accordingly, the output of the multimodal fusion layer module is a combined, single audio-visual embedding representation $e_{fused}$ in Equation 2, which can also be referred to as $e_{multimodal}$ as shown in FIG. 6.

This joint embedding that is output from the multimodal fusion layer module represents an individual's biometric. The biometric can be used for various applications, such as speaker verification (e.g., is this speaker the same speaker that was pre-enrolled?) or speaker identification purposes (e.g., if this speaker is the same speaker who was verified and matched with a pre-enrolled user, then this speaker can now be identified by the pre-enrolled identity).

With reference to FIG. 7 again, biometrics output from the multimodal fusion layer module can be supplied to the contrastive loss module, which utilizes a N-dimensional multimodal representation. The contrastive loss module performs optimization using a generalized end-to-end loss function extended for multi-modal inputs (e.g., GE2E-MM) for the task of speaker verification.

Large scale datasets often contain noisy labels that can confuse networks during. training and limit performance. The AI device 100 can leverage these noisy samples to improve generalizability. For example, the contrastive loss module of the AI device 100 can used a centroid-based optimization approach, in which outliers and noisy labels can act as a regularizer during training to lead to better generalization. The loss function of the contrastive loss module can be referred to as GE2E-MM loss.

According to an embodiment of the present disclosure, the contrastive loss module (e.g., using GE2E-MM) can produce a similarity score between each speaker audio-visual embedding (e.g., utterance-visual embedding) and speaker centroids that is calculated via cosine distance (e.g., Equation 7, below).

For example, each of the speaker centroids can be viewed as a proxy embedding representation to summarize their biometric from a collection of their individual audio-visual embeddings. The speaker centroid can be calculated as a geometric mean of a speaker's audio-visual utterance embeddings (e.g., Equations 5 and 6, below).

In addition, the contrastive loss module can use a similarity matrix to determine how similar one speaker's utterance representation (e.g., audio-visual embedding) is to another speaker's representation.

Also, the contrastive loss module can form the loss function from the similarity matrix by using the negative aggregate of the similarities between each audio-visual embedding and that same speaker's centroid embedding (e.g., the proxy representation of that speaker), and the similarity score of the closest non-speaker audio-visual embedding (e.g., from among other speakers or users who are not the current speaker). Further, the similarity score of the closest non-speaker audio-visual embedding represents a hard negative sample, whose distance should be maximized. This process is discussed in more detail below with regards to Equation 9, and is repeated for each speaker to form the GE2E-MM loss for a given batch as in Equation 8.

Further, the contrastive loss module can use back-propagation to update the weights of the model. The resulting effect due to the back-propagation is that audio-visual embeddings of the same speaker are pushed closer together while audio-visual embeddings from other speakers are pushed farther away. In other words, the contrastive loss module performs optimization to further discriminate one speaker from other speakers.

In other words, the GE2E-MM loss for audio/visual-based speaker verification uses class centroid distances during optimization. For example, the GE2E-MM loss is calculated from a similarity matrix between each utterance representation embedding (e.g., audio-visual embedding) to all other speaker utterance centroids. From this similarity matrix, a total contrastive loss is calculated based upon positive components (e.g., distance between each audio/visual utterance to its own speaker audio-visual utterance centroid) and a hard negative component (e.g., distance between the audio-visual utterance to its closest false speaker centroid). In this way, an audio-visual person encoder can be provided.

In more detail, the GE2E-MM training can be based on processing a large number of audio-visual embedding utterances at once, in the form of a batch that contains N speakers, with M audio-visual embedding utterances from each speaker.

For example, the GE2E-MM architecture can rule on batching N×M audio and visual inputs, $x_{(a,\ v),ji}$ ($1 \le j \le N$, $1 \le i \le M$), where N and M are unique speaker and speaker utterances, respectively. In other words, these audio-visual utterances are from N different speakers, and each speaker has M audio-visual utterances.

Further, the audio-visual latent representation can be defined as Equation 4, below.

[Equation 4]

$$e_{ji} = \frac{f(x_{a,ji}; x_{v,ji}; w)}{\|f(x_{a,ji}; x_{v,ji}; w)\|_2} \tag{4}$$

In Equation 4, $f(x_{a,ji}; x_{v,ji}; w)$ represents the transfer function of the neural network which represents the parts of system including the audio/visual backbones and the AFNN, in which $x_{a,ji}$ and $x_{v,ji}$ represent raw audio and visual inputs, and w represents the multi-modal network weights. In other words, Equation 4 simplifies the notation of the components up to the loss function, which is described in more detail below.

Also, in Equation 4, $e_{ji}$ corresponds to a plurality of multimodal embeddings (e.g., $e_{multimodal}$) that are output by the AFFN in the multimodal fusion layer module 406, in which j and i refer to a multimodal embedding representing audio-visual utterance j from speaker i.

The outputs of Equation 4 are fed an inputs to the GE2E-MM architecture for the purpose of training, in which the raw audio and visual inputs are part of a training set.

Further, the GE2E-MM architecture minimizes a loss calculated from the N×M similarity matrix from the batch of feature vectors $e_{ji}$ ($1 \le j \le N$, $1 \le i \le M$) against their corresponding centroids.

Each of the centroids can represent a speaker identity or a proxy representation of that speaker according to Equation 5, below.

[Equation 5]

$$c_k = \frac{1}{M}\sum_{m=1}^{M} e_{km} \tag{5}$$

In addition, the similarity matrix, $S_{ij,k}$, of scaled cosine similarities can be computed as shown in Equation 6 below, which represents a similarity metric between each multimodal embedding (e.g., audio-visual embedding) and each speaker centroid. According to an embodiment, the audio-visual embedding of the current speaker can be removed when computing centroids for the case where k=j (e.g., same speaker) to improve stability, as shown in Equation 7, below.

[Equation 6]

$$c_k^{(-i)} = \frac{1}{M-1}\sum_{\substack{m=1 \\ m \ne i}}^{M} e_{jm} \tag{6}$$

[Equation 7]

$$S_{ji,k} = \begin{cases} w \cdot \cos\left(e_{ji}, c_j^{(-i)}\right) + b & k = j \\ w \cdot \cos(e_{ji}, c_k) + b & k \ne j \end{cases} \tag{7}$$

The similarity matrix, $S_{ij,k}$, can be used to calculate a contrastive loss for each audio-visual embedding representation, $e_{ji}$, focusing on all positive pairs and a hard-negative pair.

The positive pairs are between each audio-visual utterance embedding and their corresponding speaker's centroid. The negative pairs are between each audio-visual utterance embedding and the centroid of a false speaker (e.g., a different person). For example, the hard negative pair can be the pair with the highest similarity.

By minimizing the contrastive loss, the model learns to represent similar data points with similar embeddings and dissimilar data points with dissimilar embeddings. In other words, the loss function encourages the model to minimize the distance between representations that are of similar samples and maximize the distance between representations of dissimilar samples. This allows the model to perform speaker verification more effectively.

According to an embodiment, the GE2E-MM loss, $L_G$, can be defined as the sum in Equation 8 below.

[Equation 8]

$$L_G(S) = \sum_{j,k} L(e_{ji}) \quad (8)$$

where,

[Equation 9]

$$L(e_{ji}) = 1 - \sigma(S_{ji,j}) + \max_{\substack{1 \le k \le N \\ k \ne j}} \sigma(S_{ji,k}) \quad (9)$$

In Equation 9, σ represents the sigmoid function, $\sigma(x)=1/(1+e^{-x})$.

Further, the AI device 100 can perform optimization of the formulation in Equation 9, which has the effect of pushing audio-visual embeddings from identical speakers towards its respective centroid, and away from its closest dissimilar speaker centroid.

In this way, the AI device 100 can identify speaker profiles as the centroid of their respective voice utterances and face tracks, which can add an effect of regularization and robustness against outliers across both of the audio and visual modalities.

For example, after training and during inference time, a short video sample of a current speaker can be edited to capture a face track cropping (e.g., of N frames) and a short audio sample (e.g., a 10-30 second audio recording) which can be input to the multimodal fusion module to generate an audio-visual embedding representation $e_{multimodal}$ which can be input into the contrastive loss module including the GE2E-MM architecture which can determine which of the speaker centroids best corresponds to the audio-visual embedding representation $e_{multimodal}$ to verify a specific speaker.

Also, once the current speaker is verified as a specific speaker from among a plurality of enrolled speakers, this can be used in various downstream tasks and applications, such as providing specialized services and recommendations that are personal to that specific person, logging into a specific account, or granting access to restricted content and services.

For example, once the user who spoke the utterance is verified as a specific authorized user, then the AI device 100 can grant access to content or play videos having certain ratings, authorize a transaction, or be used to login to a specific account, etc., but embodiments are not limited thereto. Also, the AI device 100 can provide personalized answers and recommendations to the verified speaker, which can improve the user's experience.

In other words, the AI device 100 can know who specifically is interacting with the AI device 100 based on just their voice and a short sample of visual information, without requiring the user to have to manually login every time or manually provide identification information to switch between different accounts or user profiles. In this way, the AI device 100 can seamlessly switch back and forth between different users while providing personalized services, even in a multi-user environment.

For example, the AI device 100 can provide a more human-like level of interaction, since the AI device 100 can automatically determine who is speaking and respond appropriately to that specific speaker in a personalized manner.

With reference again to FIG. 4, the AI device 100 can be further optimized with use of an auxiliary task module (e.g., an auxiliary head) to implement a multi-task objective function for training. For example, the auxiliary task module can use a supervised task loss, which can be based on a small network that can take the input batch of audio-visual utterance embedding representations and predict an age of the person.

According to an embodiment, root mean squared error loss can be used, but embodiments are not limited thereto. The goal of the auxiliary task module is to minimize the predicated age error from known ground truth age labels. The ground truth age labels can be weak labels that are incomplete or inaccurate. The loss of the auxiliary task module can be combined with the GE2E-MM loss, $L_G$, of the contrastive loss module to produce a more optimized loss function, which can be used to perform speaker verification with even higher accuracy.

The two training heads can be combined to train the AI model. However, embodiments are not limited thereto and additional training heads can be utilized depending on implementation.

Adding an age classification task can help allow more subtle voice characteristics to be extracted from the transformed unimodal inputs and embedded in multi-modal representation.

The auxiliary task module can use a multi-task loss function as defined in Equation 10, below.

[Equation 10]

$$L_{MTL} = \gamma \cdot L_G(S) + (1-\gamma) \cdot L_{AUX} \quad (10)$$

In Equation 10, the GE2E-MM loss, $L_G$, can be combined with the auxiliary task loss $L_{AUX}$, in order to generate a combined multi-task loss, $L_{MTL}$, which can improve the accuracy of speaker verification and help avoid potential overfitting issues.

Also, in Equation 10, γ is a scalar weight that can applied in order to balance the two different losses and prevent one task from dominating. Parameters values for γ can be obtained through hyperparameter tuning (e.g., γ can be set to 0.015, etc.).

For example, the age predication auxiliary task can be implemented to enhance feature learning during training. The task head can include two linear layers with a ReLU activation and batch normalization layer in between, but embodiments are not limited thereto. Also, a sigmoid layer can be used at the end of the network to represent normalized age predictions and mean-squared error loss can used as the objective function.

During interference time, the auxiliary task module can be removed or bypassed after training of the AFNN of the AI device 100 has been completed. Also, according to an embodiment, the AI device 100 can be periodically retrained and refined as more data becomes available in order to update the AI model.

The overall AI model of the AI device 100, including the various components in FIG. 4, can be referred to as a Robust Encoder for Persons through Learned Multi-TAsk Representations (REPTAR).

According to another embodiment, the REPTAR model in the AI device 100 can be even further refined or optimized during training by making use of a data augmentation technique of mixing different audio/video pairs for training the AFNN. This can be referred to as AV-Mixup.

For example, audio and visual samples sourced from the same speaker utterance can be highly correlated on speaker-irrelevant features, such as background noise, or visual/ audio information captured from the surrounding environment where the speaker is located. This can limit the learning of distinctive features and instead cause the training to focus on peripheral attributes such as noise or environmental factors. To help prevent this, a random sampling strategy where audio and visual samples are separately extracted from different audio-visual utterances from the same speaker and combined into an unsynchronized audio-visual pair before being passed into the network.

For example, a first audio sample and a first visual sample of a speaker captured during a first time period and a second audio sample and a second visual sample of the same speaker captured during a second time period after the first time period can be mixed to generate a first audio-visual pair including the first audio sample and the second visual sample of the speaker and a second audio-visual pair including the second audio sample and the first visual sample of the speaker. This mixing process can be repeated for all utterances, and for all speakers.

In other words, the process can include a decoupling process where, for each speaker or person in a collection of audio-visual utterances (e.g., audio/video clips), extract face crop tracks and audio samples.

Then, perform a recombining operation that includes forming new audio-visual video clips, from the collection of decoupled face crop tracks and audio samples, by pairing a randomly selected sampled face crop track with another randomly sampled audio clip of the same person. The result is a new audio-visual utterance instance where the audio clip does not correspond to the visuals. This can be repeated for all utterances and for all speakers within the training dataset or for at least a portion of the training dataset.

Next, during training, the recombined audio-visual utterances can then be used to form batches as part of training the AFNN (e.g., AI model) in the AI device 100. In this way, the AFNN can avoid depending too much on peripheral attributes such as noise or environmental factors, which are not particularly relevant to the person who is speaking.

According to one or more embodiments of the present disclosure, the AI device 100 can provide improved speaker recognition that is generalizable and capable of robust person representation, which can be used as a biometric for downstream applications, supporting personalized content to the user and improving the user experience with digital devices. Further, the trained AFNN (e.g., AI model) can be deployed in a recommendation system or a question and answering system.

According to an embodiment, the AI device 100 can be configured as a smart robot or smart home device that can provide personalized services to a user within a multi-user environment.

According to one or more embodiments of the present disclosure, the AI device 100 can better handle noisy data, provide enhanced immunity against outliers, and maintain performance by being capable of handling missing or corrupt input modalities.

Also, the AI device 100 can provide improved audio-visual speaker recognition, enabling fail-safe and reliable means to identify users in a multi-user environment, and provide more human-like interactions with machines and personalized services for multi-user interactions.

According to an embodiment, the AI device 100 can be configured to answer user queries and/or recommend items (e.g., home appliance devices, mobile electronic devices, movies, content, advertisements or display devices, etc.), options or routes to a user. The AI device 100 can be used in various types of different situations.

According to one or more embodiments of the present disclosure, the AI device 100 can solve one or more technological problems in the existing technology, such as providing speaker recognition and generate a biometric that best represents a user's audio/visual identity, which can also better handle noisy data, provide enhanced immunity against outliers, and maintain performance by being capable of handling missing or corrupt input modalities.

Various aspects of the embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Furthermore, although some aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Although the present disclosure has been described in detail with reference to the representative embodiments, it will be apparent that a person having ordinary skill in the art can carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A method for controlling an artificial intelligence (AI) device, the method comprising:

obtaining, via a processor in the AI device, a video sample of a user and an audio sample of the user;

generating, via a neural network, a visual embedding based on the video sample and an audio embedding based on the audio sample, the visual embedding and the audio embedding being multi-dimensional vectors;

generating, via the neural network, an audio-visual embedding based on a combination of the visual embedding and the audio embedding;

determining, via the processor, a specific pre-enrolled audio-visual embedding from among a plurality of pre-enrolled audio-visual embeddings corresponding to pre-enrolled users based on a distance away from the audio-visual embedding within a joint audio-visual subspace; and verifying, via the processor, the user as a specific pre-enrolled user corresponding to the specific pre-enrolled audio-visual embedding, wherein the neural network is trained based on a loss function that uses a plurality of audio-visual embeddings, each of the plurality of audio-visual embeddings includes an audio component and a visual component, wherein the loss function is based on a combined multi-task loss that includes a generalized end-to-end multi-modal (GE2E-MM) loss based on the audio component and the visual component added to an auxiliary task loss corresponding to an age component, and wherein the loss function is defined by equation:

$$LMTL = \gamma \cdot LG(S) + (1 - \gamma) \cdot LAUX,$$

wherein LMTL is the combined multi-task loss, LG is the GE2E-MM loss, LAUX is the auxiliary task loss, S is based on a similarity matrix for determining similarities between the plurality of audio-visual embeddings, and $\gamma$ is a scalar weight.

2. The method of claim 1, further comprising:

outputting personalized content for the user based on the verifying the user as the specific pre-enrolled user.

3. The method of claim 1, wherein the video sample includes a face track cropping of the user including a plurality of frames, and wherein the audio sample includes a recording of a voice of the user.

4. The method of claim 1, further comprising:

training the neural network based on batching N×M audio and visual inputs to update weights of the neural network, where N and M correspond to unique speakers and unique audio-visual utterances for each of the unique speakers, respectively.

5. The method of claim 1, further comprising:

training the neural network based on a data augmentation technique that includes obtaining a first audio sample and a first visual sample of a same speaker captured during a first time period and a second audio sample and a second visual sample of the same speaker captured during a second time period after the first time period, and generating a first mixed audio-visual pair including the first audio sample and the second visual sample of the same speaker and a second mixed audio-visual pair including the second audio sample and the first visual sample of the same speaker.

6. The method of claim 1, further comprising:

transforming, via the neural network, the audio embedding into a projected audio embedding projected onto the joint audio-visual subspace;

transforming, via the neural network, the visual embedding into a projected visual embedding projected onto the joint audio-visual subspace;

multiplying, via the neural network, the projected audio embedding by a voice attention weight to generate a weighted audio embedding;

multiplying, via the neural network, the projected visual embedding by a face attention weight to generate a weighted visual embedding; and summing, via the neural network, the weighted audio embedding and the weighted visual embedding to generate the audio-visual embedding corresponding to the user.

7. The method of claim 6, wherein the voice attention weight added to the face attention weight equals 1.

8. An artificial intelligence (AI) device, the AI device comprising:

a memory configured to store a plurality of pre-enrolled audio-visual embeddings corresponding to pre-enrolled users; and a controller configured to:

obtain a video sample of a user and an audio sample of the user, generate, via a neural network, a visual embedding based on the video sample and an audio embedding based on the audio sample, the visual embedding and the audio embedding being multi-dimensional vectors, generate, via the neural network, an audio-visual embedding based on a combination of the visual embedding and the audio embedding, determine a specific pre-enrolled audio-visual embedding from among the plurality of pre-enrolled audio-visual embeddings corresponding to the pre-enrolled users based on a distance away from the audio-visual embedding within a joint audio-visual subspace, and verify the user as a specific pre-enrolled user corresponding to the specific pre-enrolled audio-visual embedding, wherein the neural network is trained based on a loss function that uses a plurality of audio-visual embeddings, each of the plurality of audio-visual embeddings includes an audio component and a visual component, wherein the loss function is based on a combined multi-task loss that includes a generalized end-to-end multi-modal (GE2E-MM) loss based on the audio component and the visual component added to an auxiliary task loss corresponding to an age component, and wherein the loss function is defined by equation:

$$\mathrm{LMTL} = \gamma \cdot LG(S) + (1-\gamma) \cdot \mathrm{LAUX},$$

wherein LMTL is the combined multi-task loss, LG is the GE2E-MM loss, LAUX is the auxiliary task loss, S is based on a similarity matrix for determining similarities between the plurality of audio-visual embeddings, and $\gamma$ is a scalar weight.

9. The AI device of claim 8, wherein the controller is further configured to:

outputting personalized content for the user based on verifying the user as the specific pre-enrolled user.

10. The AI device of claim 8, wherein the video sample includes a face track cropping of the user including a plurality of frames, and wherein the audio sample includes a recording of a voice of the user.

11. The AI device of claim 8, wherein the controller is further configured to:

train the neural network based on batching N×M audio and visual inputs to update weights of the neural network, where N and M correspond to unique speakers and unique audio-visual utterances for each of the unique speakers, respectively.

12. The AI device of claim 8, wherein the controller is further configured to:

train the neural network based on a data augmentation technique that includes obtaining a first audio sample and a first visual sample of a same speaker captured during a first time period and a second audio sample and a second visual sample of the same speaker captured during a second time period after the first time period, and generating a first mixed audio-visual pair including the first audio sample and the second visual sample of the same speaker and a second mixed audio-visual pair including the second audio sample and the first visual sample of the same speaker.

13. The AI device of claim 8, wherein the controller is further configured to:

transform, via the neural network, the audio embedding into a projected audio embedding projected onto the joint audio-visual subspace, transform, via the neural network, the visual embedding into a projected visual embedding projected onto the joint audio-visual subspace, multiply, via the neural network, the projected audio embedding by a voice attention weight to generate a weighted audio embedding, multiply, via the neural network, the projected visual embedding by a face attention weight to generate a weighted visual embedding, and sum, via the neural network, the weighted audio embedding and the weighted visual embedding to generate the audio-visual embedding corresponding to the user.

14. A method for controlling an artificial intelligence (AI) device, the method comprising:

obtaining, via a processor in the AI device, a video sample of a user and an audio sample of the user;

generating, via a neural network, a visual embedding based on the video sample and an audio embedding based on the audio sample, the visual embedding and the audio embedding being multi-dimensional vectors; and generating, via the neural network, an audio-visual embedding based on a combination of the visual embedding and the audio embedding, the audio-visual embedding being a biometric of the user, wherein the neural network is trained based on a loss function that uses a plurality of audio-visual embeddings, each of the plurality of audio-visual embeddings includes an audio component and a visual component, wherein the loss function is based on a combined multi-task loss that includes a generalized end-to-end multi-modal (GE2E-MM) loss based on the audio component and the visual component added to an auxiliary task loss corresponding to an age component, and wherein the loss function is defined by equation:

$$\mathrm{LMTL}=\gamma\cdot LG(S)+(1-\gamma)\cdot\mathrm{LAUX},$$

wherein LMTL is the combined multi-task loss, LG is the GE2E-MM loss, LAUX is the auxiliary task loss, S is based on a similarity matrix for determining similarities between the plurality of audio-visual embeddings, and γ is a scalar weight.

* * * * *